No. 694,525. Patented Mar. 4, 1902.
A. BRÜGGEMANN.
AIR BRAKE SYSTEM.
(Application filed Aug. 7, 1900.)
(No Model.) 3 Sheets—Sheet 1.

Witnesses.

Inventor.
August Brüggemann
by Henry Orth
Atty.

No. 694,525. Patented Mar. 4, 1902.
A. BRÜGGEMANN.
AIR BRAKE SYSTEM.
(Application filed Aug. 7, 1900.)
(No Model.) 3 Sheets—Sheet 2.

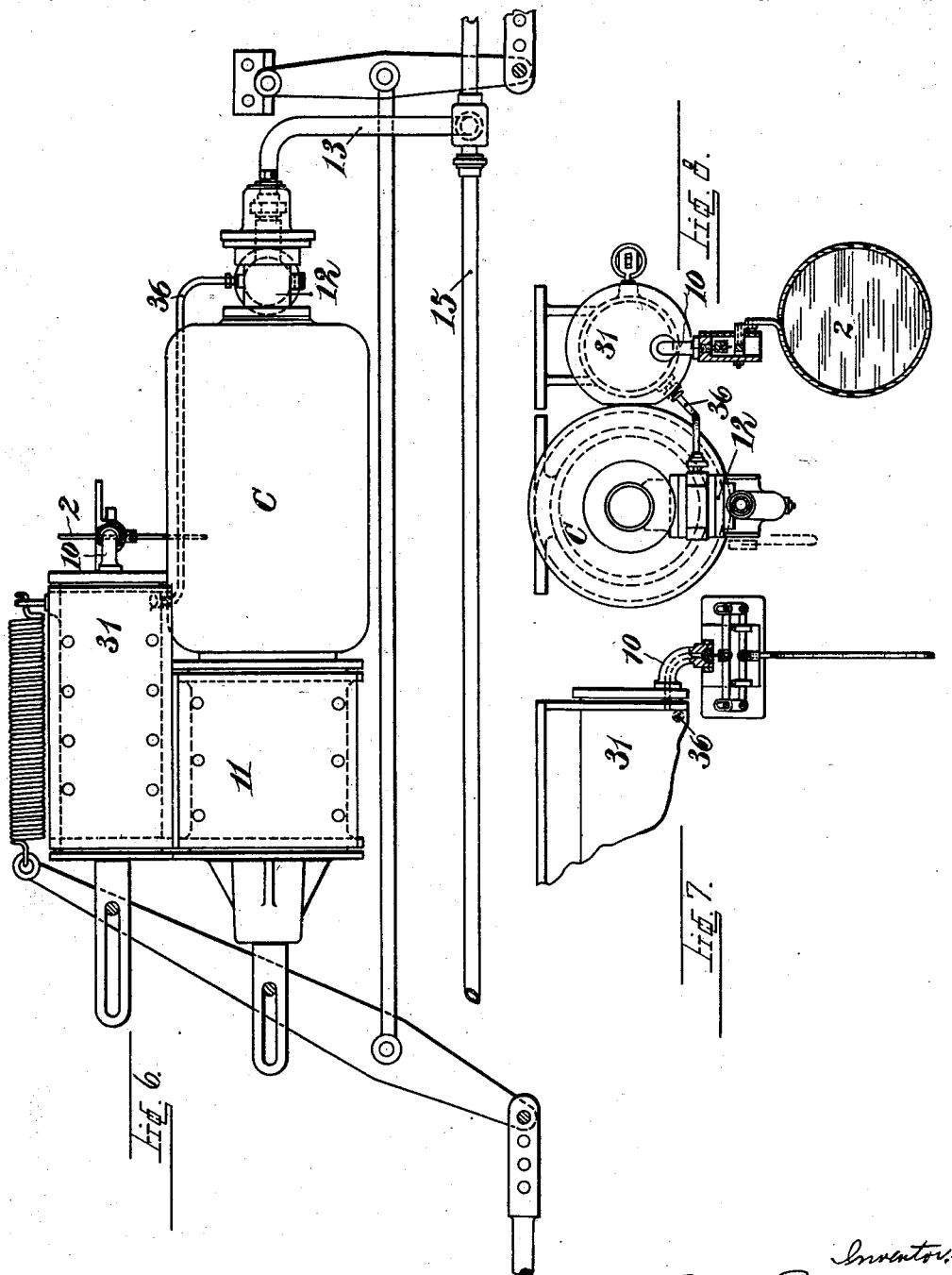

UNITED STATES PATENT OFFICE.

AUGUST BRÜGGEMANN, OF BRESLAU, GERMANY, ASSIGNOR TO THE DEUTSCHE WAFFEN-UND MUNITIONSFABRIKEN, OF KARLSRUHE IN BADEN, GERMANY.

AIR-BRAKE SYSTEM.

SPECIFICATION forming part of Letters Patent No. 694,525, dated March 4, 1902.

Application filed August 7, 1900. Serial No. 26,178. (No model.)

*To all whom it may concern:*

Be it known that I, AUGUST BRÜGGEMANN, a subject of the King of Prussia, and a resident of Breslau, Germany, have invented certain new and useful Improvements in Air-Brake Systems; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The object of the present invention is to regulate the pressure of air in the brake-cylinders of an air-brake system in accordance with the speed of the train, whereby a greater air-pressure will be maintained in one or more brake-cylinders during high speed than at normal running, which is accomplished by means of a valve connected to the brake-cylinder loaded by means of wind-pressure on vane or diaphragm connected by suitable machinery to said valve.

Figure 1:
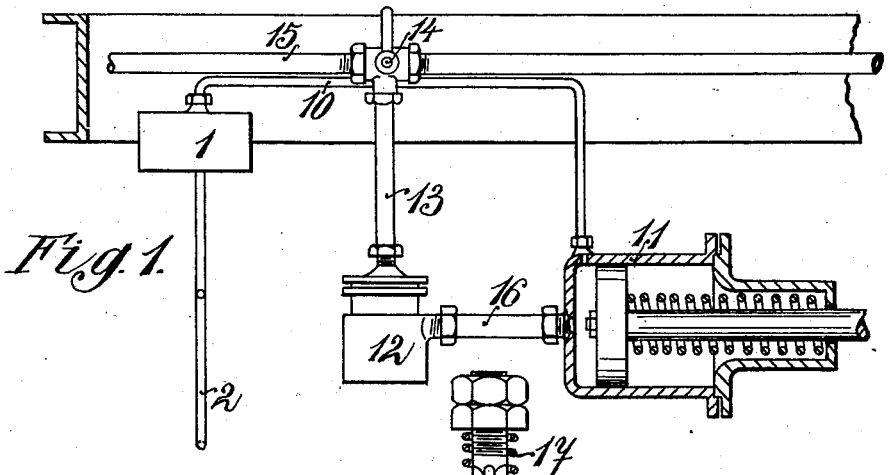
Figure 2:
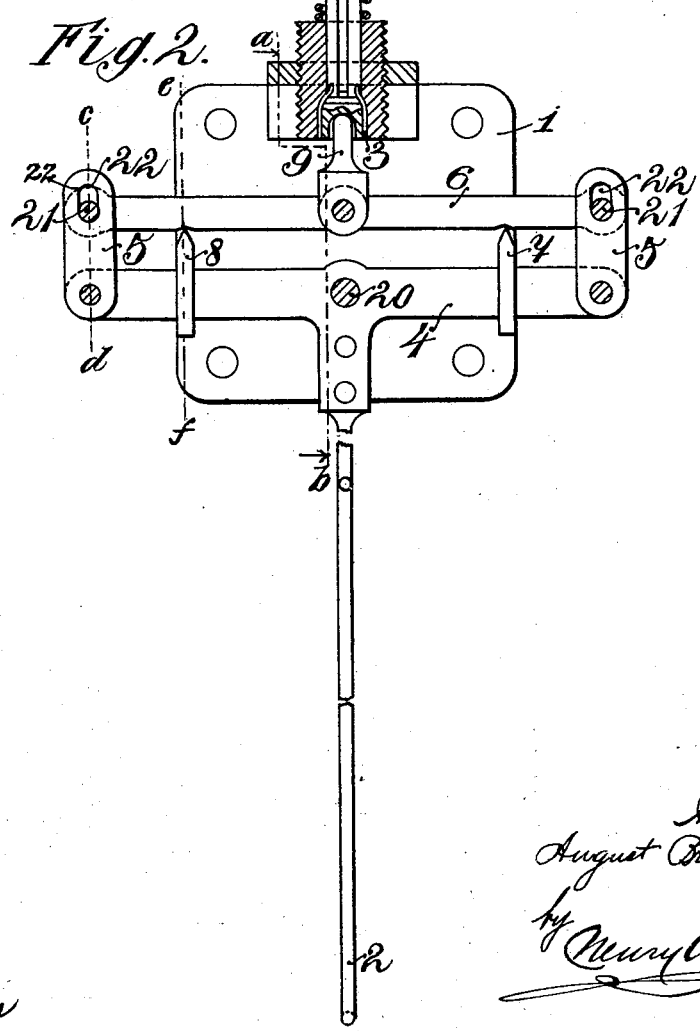
Figure 3:
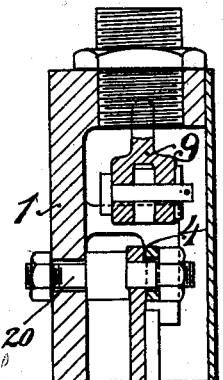
Figure 5:
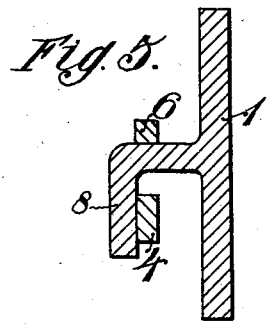
Figure 4:
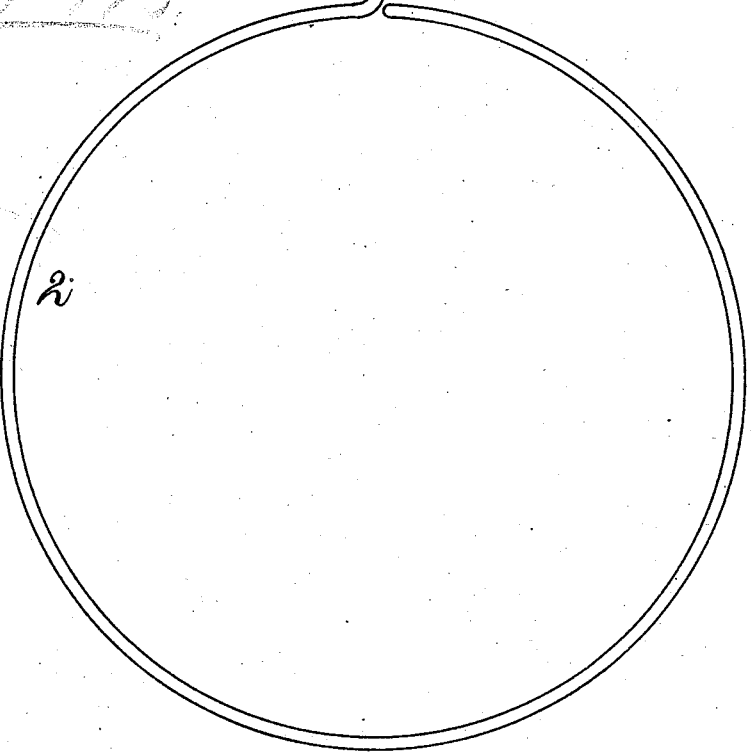
Figure 4:
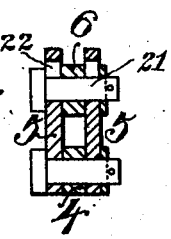

Referring to the drawings, in which like parts are similarly designated, Figure 1 is a side view of the valve connected with the brake-cylinder by means of a pipe, the brake-cylinder being in section. Fig. 2 is a section of the valve with its operating mechanism in elevation. Fig. 3 is a section on the line *a b*, Fig. 2. Fig. 4 is a section on the line *c d*, Fig. 2. Fig. 5 is a section on the line *e f*, Fig. 2. Fig. 6 is a top plan view of the brake-operating mechanism of a single car with the valve attached to a supplementary brake-cylinder. Fig. 7 is a view showing a portion of the brake-cylinder and valve, and Fig. 8 is an end view of Fig. 6.

In connecting the regulator or governor to a main or supplementary brake-cylinder the valve 3 is loaded by means of a spring 17 to such an extent as to counterbalance the maximum running and prevent the brake-cylinder from being vented to the atmosphere. Ordinarily an excess of the predetermined pressure in the brake-cylinder will open this valve to vent the cylinder until the pressure is lowered to the required degree; but when the train is running fast the wind-pressure on the vane is increased, and in order to stop the train higher pressure in the brake-cylinder is desirable, and this wind-pressure will be added to the load on the valve to keep it closed.

When attached to a supplementary brake-cylinder put in action when emergency-brakes are applied, the spring 17 is omitted, so that there will be no pressure in the supplementary brake-cylinder when the train is not in motion.

The pivot-bolt 20, secured to the plate or bracket 1, supports the two-armed lever 4, to which is riveted or otherwise secured the vane 2. This vane, diaphragm, or other wind-resistance is here shown as composed of a ring, to which is secured sail-cloth, sheet-iron, or other suitable material. Each end of the lever 4 is connected by means of links 5 to a parallel lever 6, which is fulcrumed on one of the two fulcrum-points 7 8, according to the direction of motion of the train, said fulcrums being secured to the plate or other carrier 1. (Shown clearly in Fig. 5.) The lever 6 has pivoted at the middle a lug 9, that takes into a recess in the under face of the valve 3, which, as shown in Fig. 1, is connected by pipe 10 to the brake-cylinder 11 and in Figs. 6, 7, and 8 to a supplementary brake-cylinder 31.

When the train is moving in one direction, the lever 4 is moved around its pivot 20 by the resistance of the vane to the air, which will also move the lever 6 around one and lift it off the other of its fulcrums 7 8.

The bolts 21 on the ends of the lever 6 have sufficient play in the slots 22 in the links 5 to permit enough motion of the lug 9 at the middle of the lever 6 to close or to hold the valve 3 against its seat.

By regulating the dimensions of the parts, as the size of the vane 2 and the length of the levers, the valve can be so loaded by wind-pressure that the entire braking pressure will not open it. In air-brake systems with main brake-cylinders the triple valve 12, which can be of any desired construction, is connected by a pipe 13 to the train-pipe 15 through the valve 14 and to the brake-cylinder directly or by a pipe 16, Fig. 1, and this cylinder connected by pipe 10 to a suitable casing containing the spring 17 and valve 3.

Referring to Figs. 6, 7, and 8, C is the auxiliary reservoir, 11 the brake-cylinder, and 31 the supplemental brake-cylinder; 12, the triple valve arranged to supply air by pipe 36 to the supplementary brake-cylinder 31.

Having thus described my invention, what I claim as new therein, and desire to secure by Letters Patent, is—

1. A regulating-valve for air-brake cylinders and mechanism operated by wind-pressure caused by the velocity of the train to load the same, substantially as set forth.

2. A regulating-valve for air-brake systems, connected to a brake-cylinder opened by air-pressure from within said cylinder and lever mechanism operated by wind-pressure caused by the velocity of the train to load said valve, substantially as set forth.

3. A regulating-valve for air-brake systems normally open and mechanism operated by wind-pressure caused by the velocity of the train to close the same, substantially as set forth.

4. A regulating-valve for air-brake systems, comprising a normally open valve, a lever pivoted to a fixed element, a second lever parallel with the first and connected thereto, a fulcrum for said second lever, a lug attached to the second lever and arranged to operate said valve, substantially as and for the purpose set forth.

5. A regulating-valve for air-brake systems, comprising a valve, a lever pivoted to a fixed element, a second lever parallel therewith and connected with the first-mentioned lever, a lug at the middle of the second lever arranged to engage said valve, a fulcrum for the second lever, and means for moving the lever system to load the valve, substantially as set forth.

6. A regulating device for air-brake systems, comprising a valve, a lever pivoted at its center to a fixed element, a second lever parallel with the first, links connecting the second lever to and supporting it from the first lever at its ends, a fulcrum on either side of the center of the second lever, a lug pivoted to the middle of the second lever and arranged to operate said valve, and a vane moved by wind-pressure rigidly connected to the first lever to swing the system on its pivots toward the valve, substantially as and for the purpose set forth.

7. In combination with an air-brake cylinder, a relief-valve normally open and connected therewith, and mechanism operated by wind-pressure to regulate the load on said valve, substantially as set forth.

8. The combination with an air-brake system and of a supplementary brake-cylinder, of a valve to vent said cylinder to the atmosphere, and mechanism operated by wind-pressure caused by the velocity of the train to load said valve, substantially as and for the purpose set forth.

In testimony that I claim the foregoing as my invention I have signed my name in presence of two subscribing witnesses.

AUGUST BRÜGGEMANN.

Witnesses:
HERMANN BARTSCH,
ALBERT SCHENK.